(12) United States Patent
Pack, III et al.

(10) Patent No.: US 10,146,597 B2
(45) Date of Patent: Dec. 4, 2018

(54) DELEGATING HANDLING OF COMPUTING EVENTS OF A MOBILE DEVICE APPLICATION

(71) Applicant: salesforce.com, inc., San Francisco, CA (US)

(72) Inventors: Richard Perry Pack, III, San Francisco, CA (US); Kevin Venkiteswaran, Alameda, CA (US); Qingqing Liu, Dublin, CA (US); Sachin Desai, San Francisco, CA (US); Phillip Norman Calvin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 179 days.

(21) Appl. No.: 14/507,373

(22) Filed: Oct. 6, 2014

(65) Prior Publication Data

US 2015/0135198 A1    May 14, 2015

Related U.S. Application Data

(60) Provisional application No. 61/904,113, filed on Nov. 14, 2013.

(51) Int. Cl.
    *G06F 9/54* (2006.01)
(52) U.S. Cl.
    CPC .................................. *G06F 9/542* (2013.01)
(58) Field of Classification Search
    CPC ...................................................... G06F 9/542
    See application file for complete search history.

(56) References Cited

U.S. PATENT DOCUMENTS

| | | | |
|---|---|---|---|
| 5,021,976 A | * | 6/1991 | Wexelblat ............. G06T 11/206 345/581 |
| 5,577,188 A | | 11/1996 | Zhu |
| 5,608,872 A | | 3/1997 | Schwartz et al. |
| 5,649,104 A | | 7/1997 | Carleton et al. |
| 5,715,450 A | | 2/1998 | Ambrose et al. |
| 5,761,419 A | | 6/1998 | Schwartz et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — S. Sough
*Assistant Examiner* — Kimberly L Jordan
(74) *Attorney, Agent, or Firm* — Weaver Austin Villeneuve & Sampson LLP

(57) ABSTRACT

Disclosed are examples of systems, apparatus, methods and computer program products for delegating handling of computing events of a mobile device application. For example, an identification of a computing event can be received. The computing event can have associated metadata. The computing event can be associated with a first component of a plurality of components of a first application executable on a mobile device. The plurality of components can comprise at least a native component and a web browser component. One or more rules can be applied to the metadata. Based on the application of the one or more rules to the metadata, a second component can be identified for handling the event. Handling of the event can be delegated to the second component.

20 Claims, 9 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,088,564 B1 * | 7/2015 | Hobson ............... H04L 63/083 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0223951 A1* | 9/2012 | Dunn ............... G06Q 10/10 345/467 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0238706 A1 | 9/2013 | Desai |
| 2013/0247216 A1 | 9/2013 | Cinarkaya et al. |
| 2013/0332700 A1* | 12/2013 | Kopylovitz ........ G06F 3/0604 711/209 |
| 2014/0129724 A1* | 5/2014 | Pillay ............... H04L 67/2804 709/227 |
| 2014/0208259 A1 | 7/2014 | Desai |
| 2014/0208266 A1 | 7/2014 | Desai et al. |
| 2014/0222833 A1* | 8/2014 | Jia ..................... G06Q 30/02 707/748 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0081764 A1* | 3/2015 | Zhao ................... H04L 67/08 709/203 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

* cited by examiner

DELEGATING HANDLING OF COMPUTING EVENTS OF A MOBILE DEVICE APPLICATION

PRIORITY DATA

This patent document claims priority to and commonly assigned U.S. Provisional Patent Application No. 61/904,113, titled "System and Method for Delegating Handling of Events to Web Browser and Native Components of Mobile Device Applications", by Pack et al., filed on Nov. 14, 2013, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to the handling of computing events on a mobile device. More specifically, this patent document discloses techniques for delegating handling of computing events to specific components of a mobile device application.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can use a variety of computing devices including mobile devices to interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products for delegating handling of computing events of a mobile device application. These drawings in no way limit any changes in form and detail that may be made by one skilled in the art without departing from the spirit and scope of the disclosed implementations.

DETAILED DESCRIPTION

Figure 1:
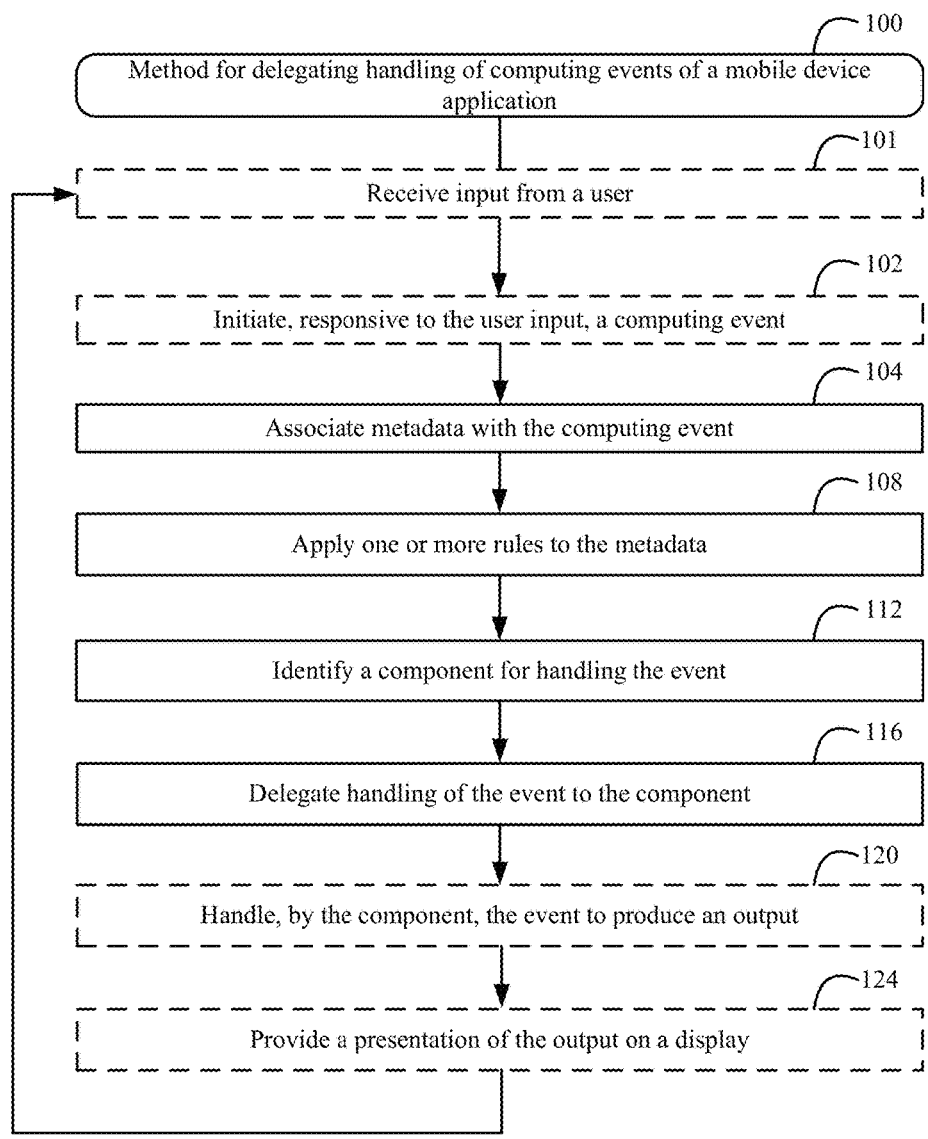
FIG. 1 shows a flowchart of an example of a computer implemented method 100 for delegating handling of computing events of a mobile device application, performed in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to delegate handling of computing events of an application executing on a mobile device such as a tablet or a smartphone. A computing event can be initiated on a mobile device or other computing device responsive to an action, such as a user clicking or tapping on an object displayed in a graphical user interface (GUI) on a display of the device, or responsive to an occurrence such as a message or notification being received or output at the device. By way of example, a user taps or otherwise makes a selection in the GUI indicating a request to navigate to a social network feed using an application (app) installed on her smartphone. The user's request to navigate to her social network feed might initiate a "navigateToFeed" computing event, which would cause the feed to be loaded and displayed in the GUI when the computing event is processed by a processor of the user's device. An app installed on the user's device, such as the Salesforce1 ® mobile app, might then detect the navigateToFeed event, and load the user's social network feed on her smartphone.

A mobile device app that includes at least: (1) a web browser component such as a webview, which can render content such as a social network feed on a web site, and (2) a native component, such as Objective-C or Java, is generally referred to herein as a hybrid mobile app. Traditionally, developers of applications installed on computing devices have used a native container to host web content. For example, if an object were to be rendered using HyperText Markup Language version 5 (HTML5), a browser would display a static web page. Thus, a user might wish to close the browser for the purpose of re-visiting a previously rendered window or presentation. Traditionally developers have used application program interfaces (APIs) to access native operating system features, such as a camera, adding processing overhead. The disclosed techniques for delegating the handling of events to a web browser component or a native component of a hybrid mobile app can improve mobile device functionality by decreasing processing overhead.

In some of the disclosed implementations, a "switchboard" is a component of a hybrid mobile app that provides event monitoring and queuing and is configurable based on server-side configurations, such as metadata APIs, organization administrator permissions, and other factors. The switchboard essentially serves as the "heart" of the app by enabling event bridging such that events can be dispatched seamlessly between native and web browser components. In some implementations, the switchboard uses controllers to expose the native component to the web browser component and expose the web browser component to the native component, resulting in a two-way event model for data processing and user interface implementation. By way of illustration, the Android operating system renders picklists using the native Android picklist, but the switchboard enables the picklist to be changed to a web browser dropdown box.

In one example of event delegation, Erica, a customer service representative, wants to view information pertaining to a specific account record maintained in a Customer Relationship Management (CRM) database using a hybrid mobile app on her mobile device. Erica might begin by navigating to a list of a set or subset of accounts stored in the CRM database, where the list is implemented in native code. At this point, Erica might tap a graphical object on a GUI of her device to request to navigate to a particular account record for the ACME Corporation. Alexa, an administrator, might have decided that the record view is best rendered by a web browser component of the hybrid mobile app. Thus, Alexa customized the hybrid mobile app accordingly. In such a scenario, Erica's request to navigate to the account record for the ACME Corporation initiates a computing event named "navigateToDetail." At this point, the navigateToDetail computing event will be delegated to the web browser component of the hybrid mobile device app. In other words, the account record for the ACME Corporation will rendered by a web browser component of the hybrid mobile app.

Along the same lines, delegation can be highly customized based on specific computing events. For example, Erica might be viewing a social network feed, rather than a list of accounts. In some implementations, when Erica clicks on a name in the social network feed to request to view more information, a computing event named "navigateToFeedItemDetail" can be initiated. Since the entity navigated to by Erica is a person's social network page or profile rather than a CRM record, the hybrid mobile app might be customized such that the navigateToFeedItemDetail computing event will be handled by the native component.

Delegation of the handling of computing events to web browser and native components of hybrid mobile device apps is also relevant in a highly customizable platform, such as an enterprise platform provided by Salesforce.com® (described below) to any number of customers. For example, Independent Software Vendors (ISVs) might each customize their platform differently. A determination about how to render a specific technology, such as a social network feed, might desirably be dynamic. For example, this determination could depend on the type of user device viewing the social network feed. In some implementations of the disclosed techniques, there can be a well-defined series of events to create cohesion across platforms between ISVs. Ultimately, there might be no way for an end user to know what is provided by an enterprise platform, customized by an administrator, or is ISV-provided. Furthermore, even if different developers are working on different parts of the platform in relative isolation from one another, the disclosed techniques can be used to create a seamless user experience because the end user has access to a uniform system for handling computing events.

Since each decision point in computing event delegation can be metadata-driven, rules for delegation can be generated and customized in a variety of manners. For instance, rules can be periodically downloaded from a server. Also or alternatively, users can have the ability to make a decision about how items are best viewed. For example, Alpha Corporation can make a rule that a record feed is best rendered by the native component. On the other hand, Beta LLP might choose to have the same or similar content rendered by the web browser component.

In some implementations, the disclosed techniques can not only be used within a specific platform, but can also be combined with invocations to and from $3^{rd}$ party apps. By way of illustration, Trang is using a first hybrid mobile app, which is unaffiliated with LinkedIn®. Trang navigates to content associated with LinkedIn®, initiating a computing event such as navigateToThirdPartyApp. At this point, the hybrid mobile app can detect whether the LinkedIn® mobile app is installed on Trang's phone. If the LinkedIn® app is installed, Trang will be routed to the app; otherwise, she will be routed to the LinkedIn® web site. Potentially, another event might be initiated, routing Trang back to the first hybrid mobile app.

In some implementations, the disclosed techniques can be used for customizable preferential routing between mobile apps. For instance, assume that Trang has both the LinkedIn® and Facebook® apps installed on her phone. Because Trang is about to graduate college, she would like to spend her time networking in order to secure a job when she graduates. In this case, Trang can customize a rule, which routes social-networking-based computing events to her LinkedIn® app rather than her Facebook® app even though she has both apps installed.

Some but not all of the techniques described or referenced herein are implemented to handle computing events associated with an enterprise social networking system. Social networking systems have become a popular way to facilitate communication among people, any of whom can be recognized as users of a social networking system. One example of a social networking system is Chatter®, provided by Salesforce.com®, inc. of San Francisco, Calif. Salesforce.com®, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by Salesforce.com®, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Figure 2:
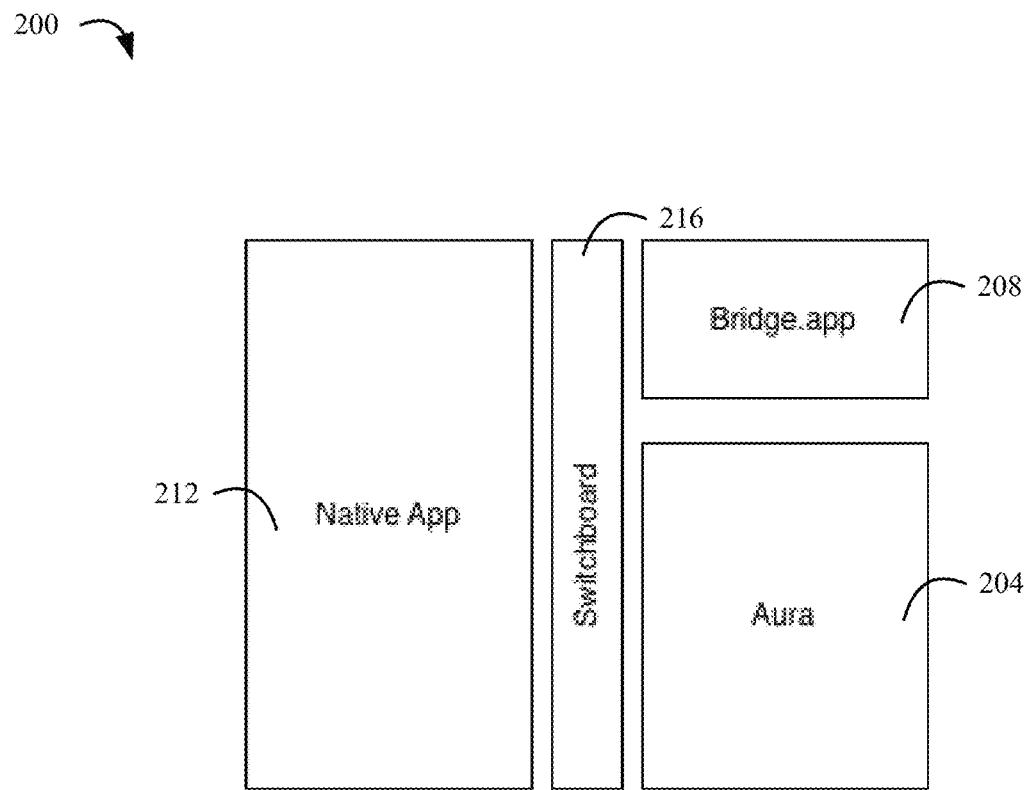
FIG. 2 shows a block diagram of an example of components of a hybrid mobile application, in accordance with some implementations.
Figure 3A:
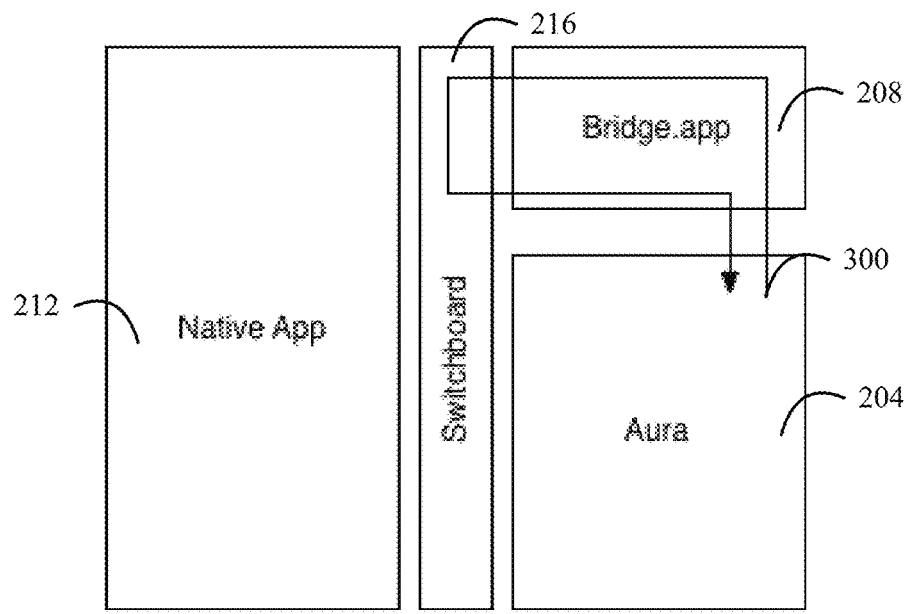
FIG. 3A shows a block diagram of an example of components of a hybrid mobile application in which a computing event is delegated among components, in accordance with some implementations.
Figure 3B:
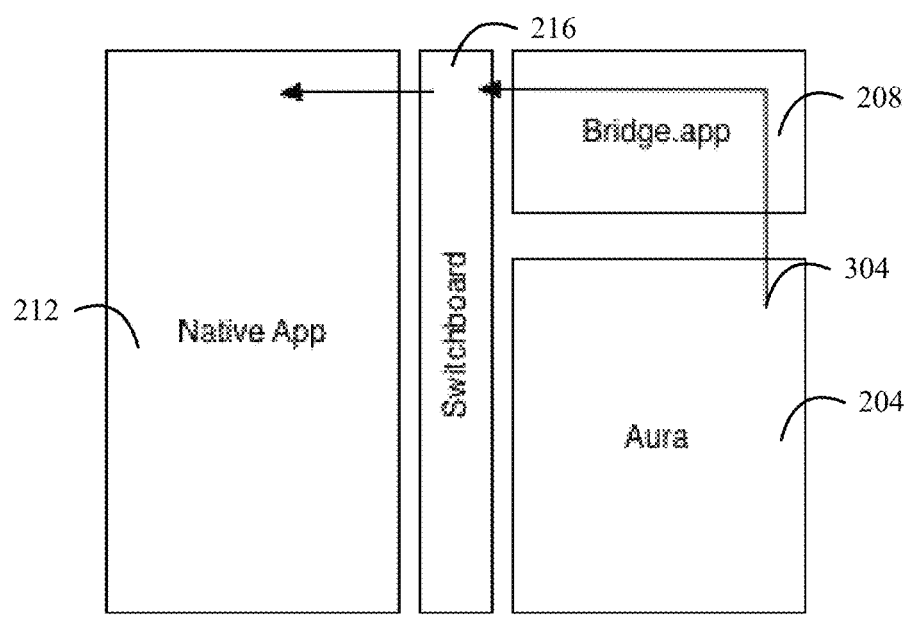
FIG. 3B shows a block diagram of an example of components of a hybrid mobile application in which a computing event is delegated among components, in accordance with some implementations.
Figure 3C:
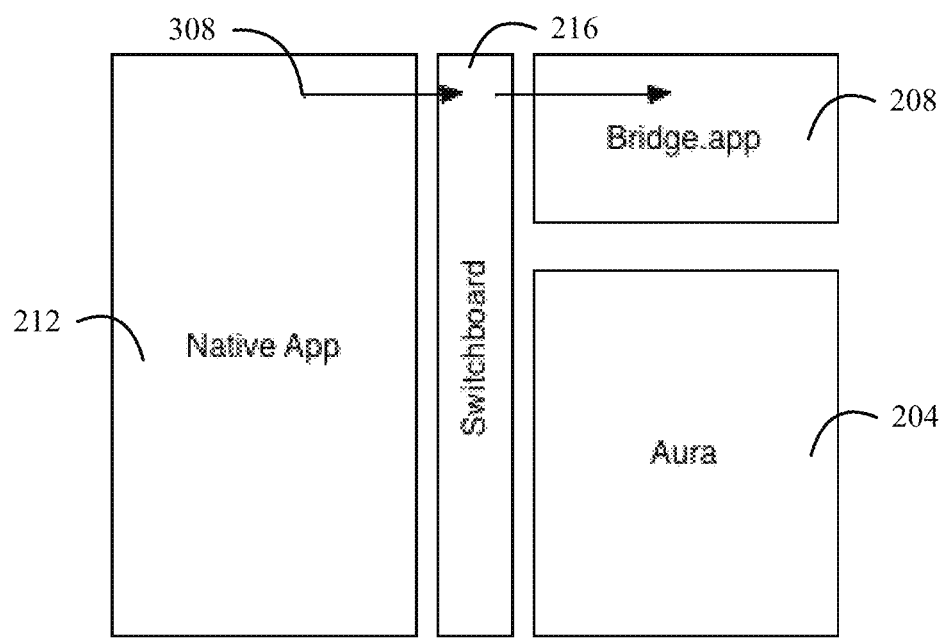
FIG. 3C shows a block diagram of an example of components of a hybrid mobile application in which a computing event is delegated among components, in accordance with some implementations.
Figure 5:
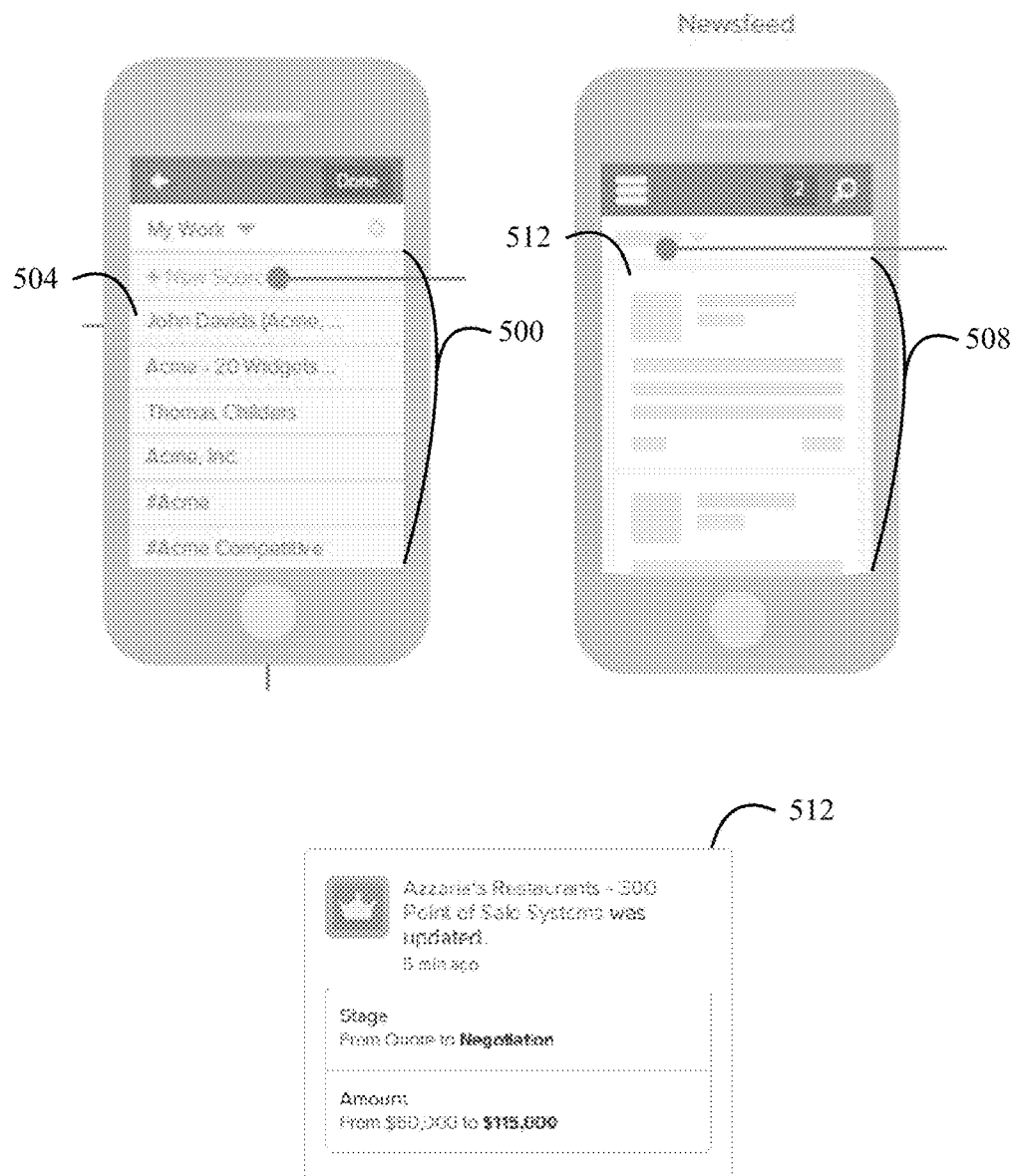
FIG. 5 shows examples of presentations displayed on a mobile device in the form of graphical user interfaces (GUIs) to illustrate event handling by a hybrid mobile application in accordance with some implementations.

FIG. 1 shows a flowchart of an example of a computer implemented method 100 for delegating handling of computing events of a mobile device application (app), performed in accordance with some implementations. FIG. 1 is described with reference to FIGS. 2, 3A-C and 5. FIG. 2 shows a block diagram of an example of components of a hybrid mobile app, in accordance with some implementations. FIGS. 3A-C show block diagrams of examples of components of a hybrid mobile app in which a computing event is delegated among components, in accordance with some implementations. FIG. 5 shows examples of presentations displayed on a mobile device in the form of GUIs to illustrate event handling by a hybrid mobile app in accordance with some implementations.

In some but not all implementations of method 100 in FIG. 1, at 101, input from a user is received at the user's device. Specific types of user input can differ across implementations. For instance, user input might indicate a user's selection of one or more records such as CRM records stored in a database system of an on-demand database service. As depicted in FIG. 5, a user might select a contact record 504 for John Davids by tapping or clicking record 504 in a list 500. Similarly, user input might reflect a selection in association with an enterprise social network feed 508 such as a selection of feed item 512. For example, a user might tap or click feed item 512 in social network feed 508 to find out more specific information about a customer account record named "Azzaria's Restaurants—300 Point of Sale Systems".

Returning to FIG. 1, at 102, in some but not all implementations of method 100, a computing event is initiated in response to the user input. As discussed above, computing events can vary greatly across implementations. For example, when a user makes a selection requesting to navigate to her enterprise social network feed 508 of FIG. 5 on her smartphone, a navigateToFeed computing event can be initiated. Similarly, if the user taps or clicks on feed item 512, a navigateToFeedItemDetail event can be initiated. Along the same lines, a navigateToList event can be initiated when a user taps on list 500 to request a complete list of database records. Those skilled in the art should appreciate that the naming scheme for particular events is arbitrary.

A computing event can be associated with, or more specifically, initiated at either a native component or a web browser component of a hybrid mobile app. By way of example, a navigateToFeed event can be initiated at the native component of the Salesforce1® mobile app when a user navigates to her Chatter® feed while she is reading a customer account record which is rendered by the native component of the Salesforce1® mobile app. Similarly, a navigateToRecord event can be initiated at the web browser component of the Salesforce1® mobile app when a user navigates to an account record while she is reading her Chatter® feed which is rendered by the web browser component of the Salesforce1® mobile app.

While the specific details of each component can vary across implementations, one example showing the components comprising a hybrid mobile app 200 is illustrated in FIG. 2. In FIG. 2, Aura 204 and Bridge.app 208 are two components which define, at least in part, the web browser component of hybrid mobile app 200 and are illustrated separately to more easily show the flow of events. In some implementations, Aura 204 might be an HTLM5-based user interface framework, such as Aura® provided by Salesforce.com®. Bridge.app 208 can host Aura® elements loaded by a Uniform Resource Locator (URL). Bridge.app 208 can propagate computing events that are initiated at Aura 204. On the other hand, Native App 212 serves as the native component of hybrid mobile app 200. Switchboard 216 is configured to determine whether an event can be handled and, if so, to which component the event should be delegated.

Returning to FIG. 1, at 104, metadata is associated with the computing event. More specifically, metadata describing or relating to a particular computing event can be linked to the computing event. By way of illustration, assume the computing event navigateToFeed is initiated in a hybrid mobile app being implemented on a particular user device. Metadata including information relating to the operating system of the particular user device, such as whether the user device is running iOS or Android, can be linked to the navigateToFeed event. Also or alternatively, metadata that is linked to a computing event might include information identifying an app, web site or data from which the user is navigating, such as a web browser presentation of a particular Chatter® feed item or a native mobile app.

Returning to FIG. 1, at 108, one or more rules can be applied to the metadata. Such rules can direct a computing event to a particular component of a hybrid mobile app based on metadata linked to the computing event at 104. By way of example, metadata might indicate that a particular navigateToFeed event was initiated when a user navigated to her Chatter® feed from a specific context such as the Salesforce.com® web site. In this case, a rule might indicate that a navigateToFeed event that is initiated from the Salesforce.com® web site should be handled by the web browser component of a hybrid mobile application.

In some implementations, a rule might indicate one or more parameters, such as the context of the Salesforce.com® web site described in the preceding example. While such parameters can differ across implementations, another non-limiting example might include a user or organizational preference such as Alpha Corporation's preference that a record feed is best rendered by the native component of a hybrid mobile app. Also or alternatively, such parameters might include a user or organizational permission set. By way of example, a certain user at Alpha Corporation might have permission to view account records while another user does not. In this case, a navigateToRecord event might be handled differently based on each user's permission.

Rules can be customized by a user. For example, a user can have the ability to set a parameter governing how certain content is to be viewed. In some implementations, a first user or organization can make a rule that certain content is best rendered by the native component of a hybrid mobile app whereas a different user or organization can make a rule that the same content is best rendered by the web browser component of the hybrid mobile app. Additionally, a set of rules can be downloaded from a server, allowing for rapid, easy, or even automatic updatability.

In FIG. 1, at 112, a component is identified for handling the computing event. Several examples are described below with reference to FIGS. 3A-C. In some implementations, identification of a component for handling a computing event occurs at Switchboard 216 of FIG. 2 and is based on the application of the one or more rules to the metadata, occurring at 108 of FIG. 1.

FIG. 3A shows an example relating to computing event 300, which is initiated at Aura 204. Computing event 300 is propagated from Aura 204 to Bridge.app 208. Bridge.app 208 in turn propagates computing event 300 to Switchboard 216, which identifies a component to handle event 300 based on an application of one or more rules to the metadata associated with computing event 300, as described above at 108 of FIG. 1. In the example of FIG. 3A, Switchboard 216 identifies that computing event 300 should be handled by Aura 204. In some implementations, computing event 300 might be delegated to Aura 204 rather than Native App 212 because a permission or preference as described above does not allow computing event 300 to be handled by Native App 212. Alternatively, regardless of any rules or parameters, Aura 204 may be identified to handle computing event 300 because computing event 300 is only suited or better suited to be handled by Aura 204.

FIGS. 3B-C illustrate several other scenarios. FIG. 3B shows an example relating to computing event 304, which is initiated at Aura 204. Switchboard 216 identifies Native App 212 to handle computing event 304 based on an application of one or more rules to the metadata associated with computing event 304, at 108 of FIG. 1. FIG. 3C shows an example relating to computing event 308, which is initiated at Native App 212. Switchboard 216 identifies Bridge.app 208 to handle computing event 308 based on an application of one or more rules to the metadata associated with computing event 308, occurring at 108 of FIG. 1.

In FIG. 1, at 116, handling of the event is delegated to the component identified at 112. A given computing event can be handled by a component in a variety of ways. In the example of FIG. 3A, Switchboard 216 sends a message to Bridge.app 208 indicating that Aura 204 has been identified to handle computing event 300; and handling of computing event 300 is delegated to Aura 204. Along these lines, in FIG. 3B, handling of computing event 304 is delegated to Native App 212, since Native App 212 is the component identified at 112 of FIG. 1. In FIG. 3C, handling of computing event 308 is delegated to Bridge.app 208, since Bridge.app 208 is the component identified at 112 of FIG. 1.

In some implementations, processing of method 100 is completed at 116. In some other implementations, processing continues at 120, where the computing event is handled by the component to which the event was delegated. In some instances, the handling of the event results in an output, such as data to be displayed in a GUI. At 124, any such output can be displayed in a presentation on a display of a computing device such as the user's tablet or smartphone. For example, returning to FIG. 5, list 500 can be displayed on a user's mobile device in response to a navigateToList event initiated when the user navigates to a list of database records. Enterprise social network feed 508 can be displayed on the user's mobile device, in response to a navigateToFeed event initiated when the user navigates to her Chatter® feed. Similarly, if the user taps or clicks on feed item 512 in social network feed 508, initiating a navigateToFeedItemDetail event, feed item 512 can be displayed on the user's mobile device.

Figure 4A:
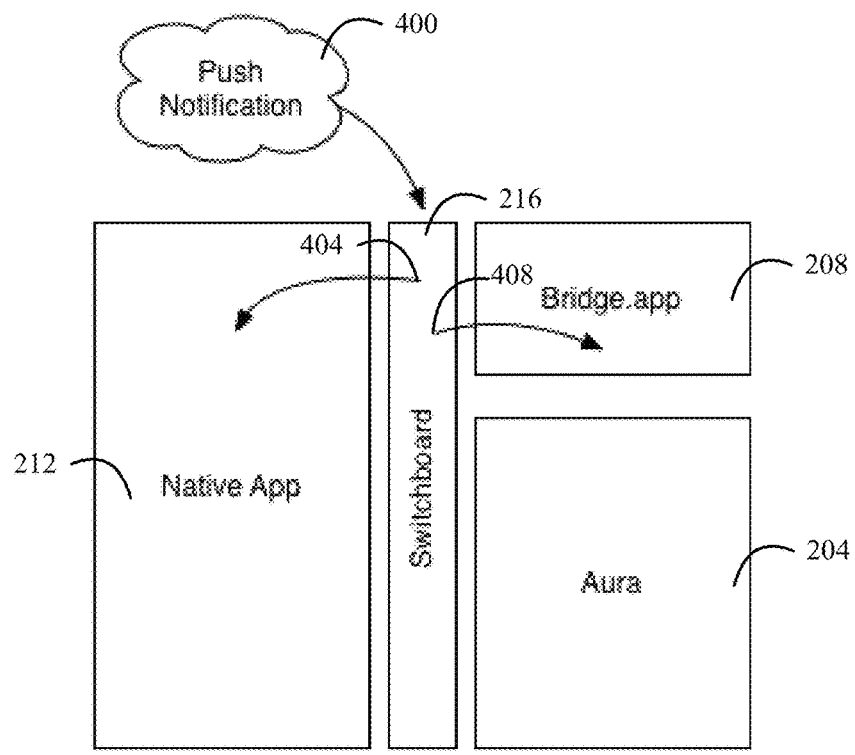
FIG. 4A shows a block diagram of an example of components of a hybrid mobile application in which a computing event is delegated among components, in accordance with some implementations.
Figure 4B:
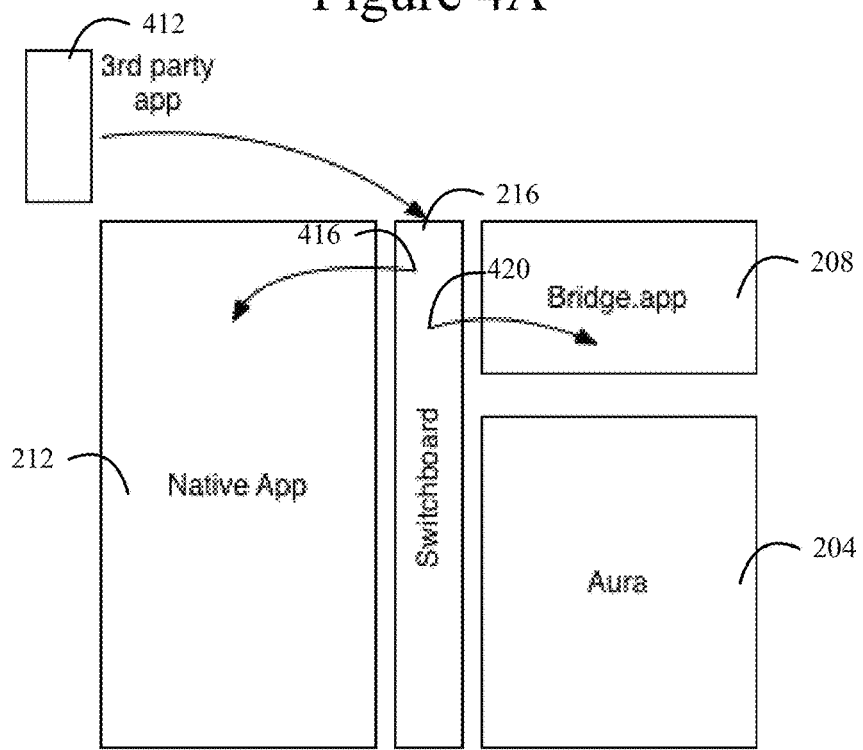
FIG. 4B shows a block diagram of an example of components of a hybrid mobile application in which a computing event is delegated among components, in accordance with some implementations.

In some implementations, computing events can be initiated in a wide variety of contexts outside of a particular hybrid mobile app. FIGS. 4A and 4B show block diagrams of examples of components of a hybrid mobile app in which a computing event is delegated among components, in accordance with some implementations. A computing event can be initiated in response to a notification or an invocation related to a third party mobile device app. For instance, in the example of FIG. 4A, Push Notification 400 is received at Switchboard 216. In some implementations, Push Notification 400 might be a notification that a user has been mentioned on Chatter®. Computing event 404 and/or computing event 408 can be initiated in response to receiving Push Notification 400 or in response to a user clicking or tapping Push Notification 400 on a mobile device. By way of illustration, the event navigateToFeed might be initiated in response to Push Notification 400 and handling of the navigateToFeed event can be delegated as described above.

FIG. 4B shows an example in which a third party app is configured to utilize the functionality of a hybrid mobile app. Invocation 412 of a third party app is received at Switchboard 216. Computing event 416 and/or computing event 420 are initiated in response to Invocation 412. In some implementations, Switchboard 216 will determine whether the third party app is authorized and route computing event 416 and/or computing event 420 to the third party app if it is indeed authorized. This process can be repeated when a user navigates back and forth between apps such as the LinkedIn® and Chatter® apps.

In some implementations, it can be useful to save data identifying computing events and identifying which components handled the events so that a user can navigate to previously viewed content. For example, a user can navigate to previously viewed content by hitting a "back" button displayed in a user interface. In some implementations, such a scheme might be carried out by storing and updating historical event data indicating that handling of an event has been delegated to a particular component. Such historical event data, which might include identifications of events and components handling the events, can be updated each time an event is delegated. Additionally, a presentation of content associated with a previous event, such as a previously viewed screen in an app, can be provided on a display responsive to user input such as a user clicking or tapping a back button. Such a presentation of content might be based on the historical event data. By way of illustration, a user who navigates from viewing a feed item in Chatter® as displayed using a web browser component to the LinkedIn® app can navigate back to the Chatter® feed.

In some implementations, an indication of a computing event might be received at a mobile device while the mobile device is offline. Data characterizing the computing event can be cached such that an indication of the computing event is received when a hybrid mobile app is loaded. By way of illustration, assume that an address changes for an account while a sales executive is on an airplane flight. Switchboard 216 can prime data characterizing the address change, that is, cache the data on a client device such that it becomes readily available upon loading the hybrid mobile app. Thus, Switchboard 216 enables data priming that helps to automatically synchronize data for the hybrid mobile app, even in an offline mode.

The computing events described above can relate to a wide variety of computing environments. In some implementations, a computing event might relate to applications and services for interacting with Customer Relationship Management (CRM) records such as accounts, tasks, leads, contacts, contracts and opportunities. For example, when a user clicks or taps on a CRM record, a navigateToRecord event might be initiated. As described above, the CRM record would then displayed on the user's computing device responsive to the navigateToRecord event.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 6A:
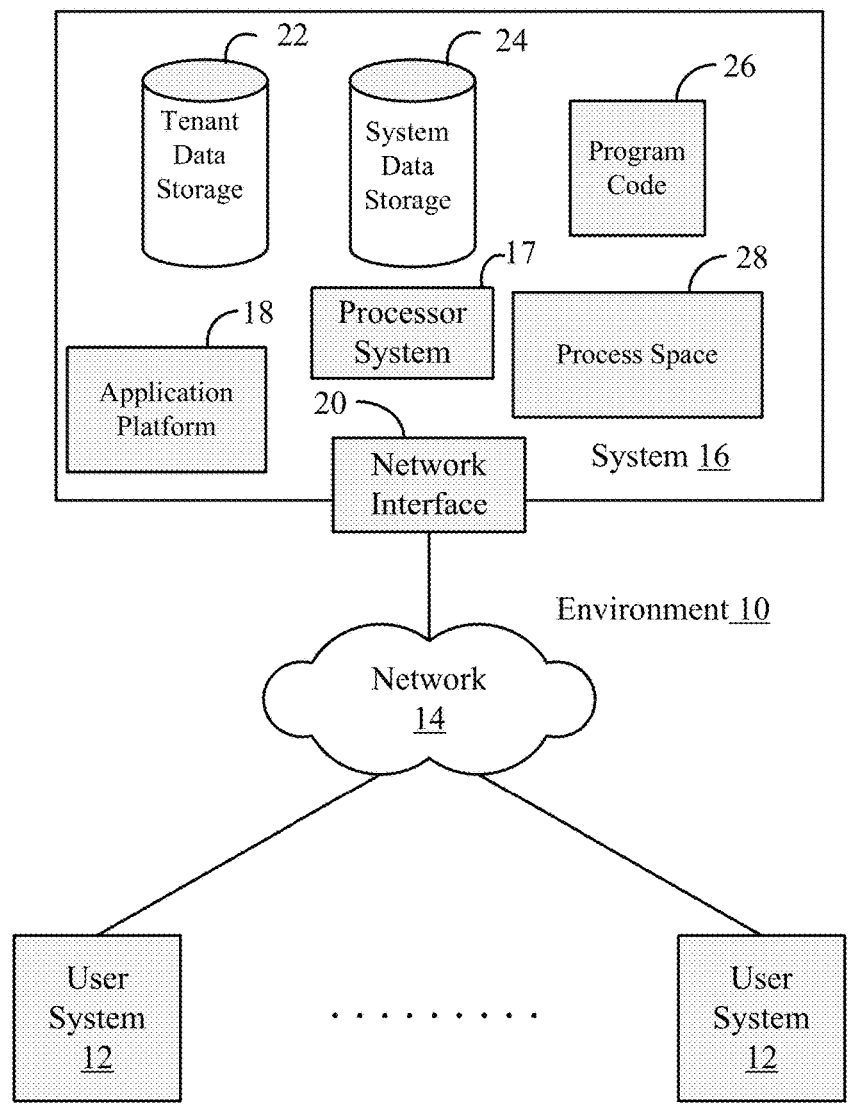
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
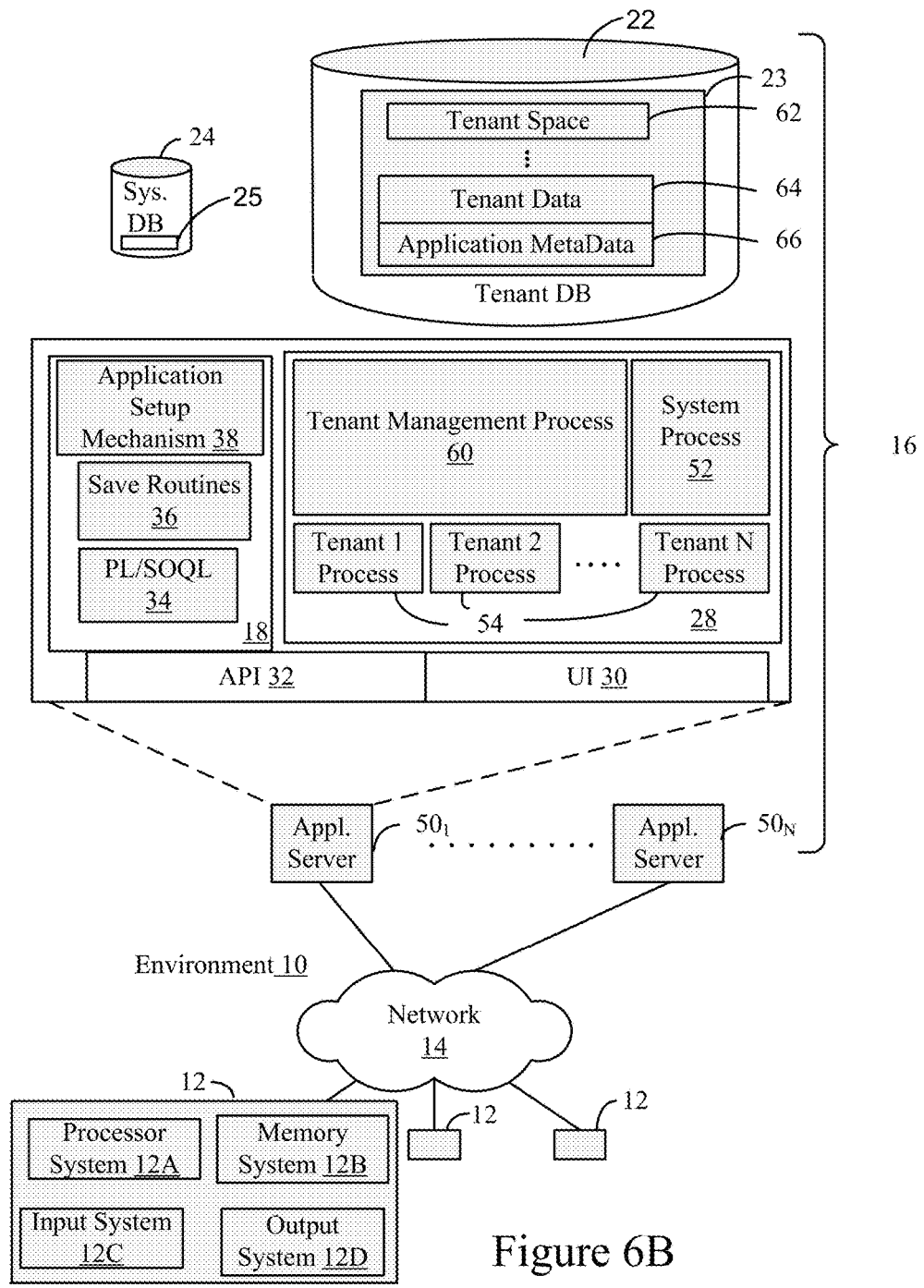
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
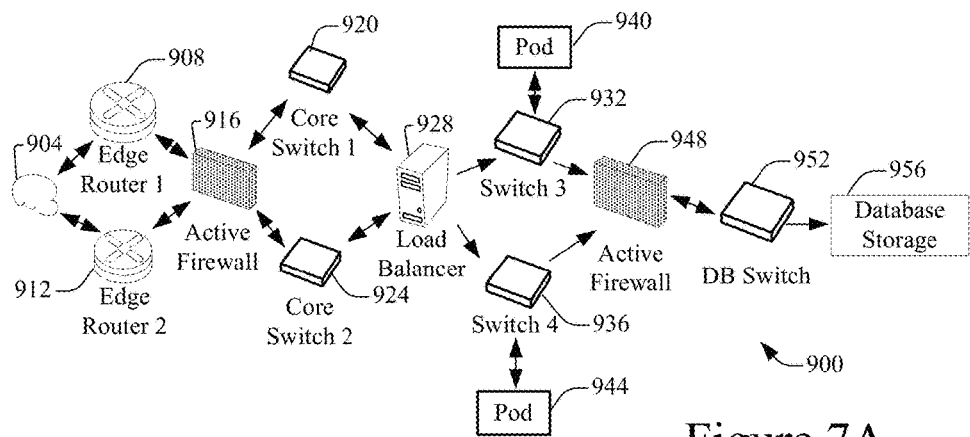
FIG. 7A shows a system diagram of an example of architectural components of an on-demand database service environment 900, in accordance with some implementations.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 7B:
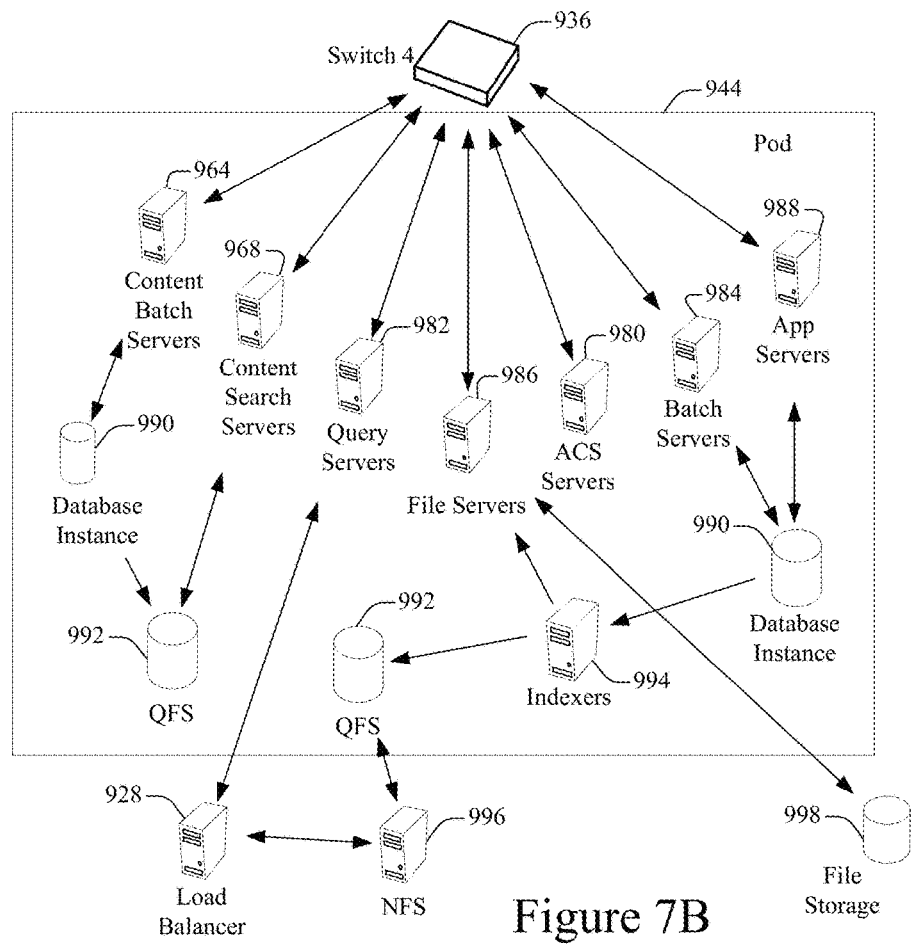
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 8A and 8B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the operations of methods described herein with reference to FIGS. 1-5. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A mobile device configured to delegate handling of computing events of a mobile device application, the mobile device comprising:
    a storage medium, and
    one or more processors configured to cause:
        processing an identification of a computing event associated with a first component of a plurality of components of a first application executable on the mobile device, the event having associated metadata, the plurality of components comprising at least a native component and a web browser component, the first application being provided by a database system of a cloud-based computing services environment, the cloud-based computing services environment having a plurality of member organizations;
        applying one or more rules to the metadata, the one or more rules defined at least in part by a permission set controllable, via the cloud-based computing services environment, by a first one of the member organizations, a user of the mobile device being a member of the first member organization, the application of the one or more rules to the metadata comprising determining that the user has been assigned a first permission in the permission set, the first permission prohibiting handling of the computing event by the first component, the one or more rules being stored on the storage medium, the one or more rules being configured to be caused, by the database system, to be automatically updated in response to a change in the permission set in the cloud-based computing services environment;
        identifying, based on the application of the one or more rules to the metadata, a second component of the plurality of components for handling the event, the second component being different from the first component;
        delegating, responsive to identifying the second component for handling the event, handling of the event to the second component;
        updating historical event data stored on the storage medium to indicate that handling of the event has been delegated to the second component, the historical event data comprising identifications of events and identifications of at least one of the plurality of components of the first application for handling the events; and providing, responsive to user input and based at least in part on the historical event data, a presentation of content associated with a previous event on a display.

2. The mobile device of claim 1, wherein the one or more rules indicate at least one of a plurality of parameters, the parameters comprising: a permission set associated with a user profile, a preference of a user, a preference of the first member organization, a permission of the first member organization, and a context.

3. The mobile device of claim 2, wherein the one or more rules are customizable by the user of the mobile device and/or an authorized member of the first member organization.

4. The mobile device of claim 1, wherein:
the first component is the native component, and the second component is the web browser component, and
the one or more processors are further configured to cause:
providing a presentation on the display of a list of one or more database records, the records related to the business of the first member organization, the presentation of the list being associated with the first component;
processing input from a user selecting a first one of the records; and
generating, responsive to the user input, the computing event, wherein the presentation of the output on the display comprises a record page indicating one or more data items stored in association with the first record.

5. The mobile device of claim 1, wherein:
the first component is the web browser component, and the second component is the native component, and
the one or more processors are further configured to cause:
providing a presentation on the display of a selection in association with a database record related to the business of the first member organization;
processing input from a user indicating the selection; and
generating, responsive to the user input, the computing event, wherein the presentation of the output on the display comprises at least one of: an enterprise social network feed associated with the database record, a feed item of an enterprise social network feed associated with the database record, or a user profile associated with the database record.

6. The mobile device of claim 1, the one or more processors being further configured to cause:
providing a presentation on the display an enterprise social network feed associated with the business of the first member organization or a feed item of an enterprise social network feed associated with the business of the first member organization;
processing input from a user indicating a selection in association with the presentation of the enterprise social network feed or of the feed item; and
generating, responsive to the user input, the computing event, wherein the presentation of the output on the display comprises at least one of: a user profile page indicating user data of a user affiliated with the first member organization, a record page indicating one or more business data items stored in association with a database record maintained on behalf of the first member organization, or a group page indicating group data of a group of users affiliated with the first member organization.

7. The mobile device of claim 1, wherein the computing event is associated with at least one of a plurality of types Customer Relationship Management (CRM) records stored in a database, the types of CRM records comprising: accounts, tasks, leads, contacts, contracts and opportunities.

8. The mobile device of claim 1, wherein the computing event is generated in association with one or both of: a notification or an invocation related to a second mobile device application.

9. The mobile device of claim 8, the one or more processors further configured to cause:
determining that the second mobile application is authorized; and
navigating, responsive to determining that the second mobile application is authorized, from the first mobile application to the second mobile application.

10. The mobile device of claim 1, wherein data characterizing the event is received while the mobile device is offline and the data characterizing the event is cached on the storage medium such that the event is received when the first mobile device application is loaded.

11. The mobile device of claim 1, the one or more processors being further configured to cause:
automatically updating the one or more rules by downloading the one or more rules from a server system associated with the database system.

12. The mobile device of claim 1, wherein the cloud-based computing services environment is a multi-tenant database environment and each of the member organizations is a tenant organization of the multi-tenant database environment.

13. A method for delegating handling of computing events of mobile device applications, the method comprising:
receiving an identification of a computing event associated with a first component of a plurality of components of a first application executable on a mobile device, the event having associated metadata, the plurality of components comprising at least a native component and a web browser component, the first application being provided by a database system of a cloud-based computing services environment, the cloud-based computing services environment having a plurality of member organizations;
applying, by a processor of a mobile device, one or more rules to the metadata, the one or more rules defined at least in part by a permission set controllable by a first one of the member organizations, a user of the mobile device being a member of the first member organization, the application of the one or more rules to the metadata comprising determining that the user has been assigned a first permission in the permission set, the first permission prohibiting handling of the computing event by the first component, the one or more rules being stored on a storage medium of the mobile device, the one or more rules being configured to be caused, by the database system, to be automatically updated in response to a change in the permission set in the cloud-based computing services environment;
identifying, based on the application of the one or more rules to the metadata, a second component of the plurality of components for handling the event, the second component being different from the first component;
delegating, responsive to identifying the second component for handling the event, handling of the event to the second component;

updating historical event data stored on the storage medium to indicate that handling of the event has been delegated to the second component, the historical event data comprising identifications of events and identifications of at least one of the plurality of components of the first application for handling the events; and providing, responsive to user input and based at least in part on the historical event data, a presentation of content associated with a previous event on a display.

14. The method of claim 13, wherein the one or more rules indicate at least one of a plurality of parameters, the parameters comprising: a permission set associated with a user profile, a preference of a user, a preference of the first member organization, a permission of the first member organization, and a context.

15. The method of claim 13, wherein:
the first component is the native component, and the second component is the web browser component, and the method further comprising:
providing a presentation on the display of a list of one or more database records, the records related to the business of the first member organization, the presentation of the list being associated with the first component;
receiving input from a user selecting a first one of the records; and
generating, responsive to the user input, the computing event, wherein the presentation of the output on the display comprises a record page indicating one or more data items stored in association with the first record.

16. The method of claim 13, wherein:
the first component is the web browser component, and the second component is the native component, and the method further comprising:
providing a presentation on the display of a selection in association with a database record related to the business of the first member organization;
receiving input from a user indicating the selection; and
generating, responsive to the user input, the computing event, wherein the presentation of the output on the display comprises at least one of: an enterprise social network feed associated with the database record, a feed item of an enterprise social network feed associated with the database record, or a user profile associated with the database record.

17. A non-transitory computer-readable medium storing computer-readable program code to be executed by one or more processors when retrieved from the non-transitory computer-readable medium, the program code including instructions configured to cause:
applying, by a processor, one or more rules to metadata associated with a computing event generated in association with a first component of a plurality of components of a first application executable on a mobile device, the plurality of components comprising at least a native component and a web browser component, the first application being provided by a database system of a cloud-based computing services environment, the cloud-based computing services environment having a plurality of member organizations, the one or more rules defined at least in part by a permission set controllable by a first one of the member organizations, a user of the mobile device being a member of the first member organization, the application of the one or more rules to the metadata comprising determining that the user has been assigned a first permission in the permission set, the first permission prohibiting handling of the computing event by the first component, the one or more rules being stored on a storage medium of the mobile device, the one or more rules being configured to be caused, by the database system, to be automatically updated in response to a change in the permission set in the cloud-based computing services environment;

identifying, based on the application of the one or more rules to the metadata, a second component of the plurality of components for handling the event, the second component being different from the first component;

delegating, responsive to identifying the second component for handling the event, handling of the event to the second component;

updating historical event data stored on the storage medium to indicate that handling of the event has been delegated to the second component, the historical event data comprising identifications of events and identifications of at least one of the plurality of components of the first application for handling the events; and providing, responsive to user input and based at least in part on the historical event data, a presentation of content associated with a previous event on a display.

18. The computer program product of claim 17, wherein:
the first component is the native component, and the second component is the web browser component, and the program code includes instructions further configured to cause:
providing a presentation on the display of a list of one or more database records, the records related to the business of the first member organization, the presentation of the list being associated with the first component;
generating, responsive to user input selecting a first one of the records, the computing event, wherein the presentation of the output on the display comprises a record page indicating one or more data items stored in association with the first record.

19. Apparatus comprising:
one or more computing devices comprising one or more processors operable to:
process an identification of a computing event associated with a first component of a plurality of components of a first application executable on a mobile device, the event having associated metadata, the plurality of components comprising at least a native component and a web browser component, the first application being provided by a database system of a cloud-based computing services environment, the cloud-based computing services environment having a plurality of member organizations;
apply one or more rules to the metadata, the one or more rules defined at least in part by a permission set controllable by a first one of the member organizations, a user of the mobile device being a member of the first member organization, the application of the one or more rules to the metadata comprising determining that the user has been assigned a first permission in the permission set, the first permission prohibiting handling of the computing event by the first component, the one or more rules being stored on a storage medium of the mobile device, the one or more rules being configured to be caused, by the database system, to be automatically updated in response to a change in the permission set in the cloud-based computing services environment;

identify, based on the application of the one or more rules to the metadata, a second component of the plurality of components for handling the event, the second component being different from the first component;

delegate, responsive to identifying the second component for handling the event, handling of the event to the second component;

update historical event data stored on the storage medium to indicate that handling of the event has been delegated to the second component, the historical event data comprising identifications of events and identifications of at least one of the plurality of components of the first application for handling the events; and provide, responsive to user input and based at least in part on the historical event data, a presentation of content associated with a previous event on a display.

20. The apparatus of claim 19, wherein the one or more rules indicate at least one of a plurality of parameters, the parameters comprising: a permission set associated with a user profile, a preference of a user, a preference of the first member organization, a permission of the first member organization, a context, and an entity.

* * * * *